Figure 1:
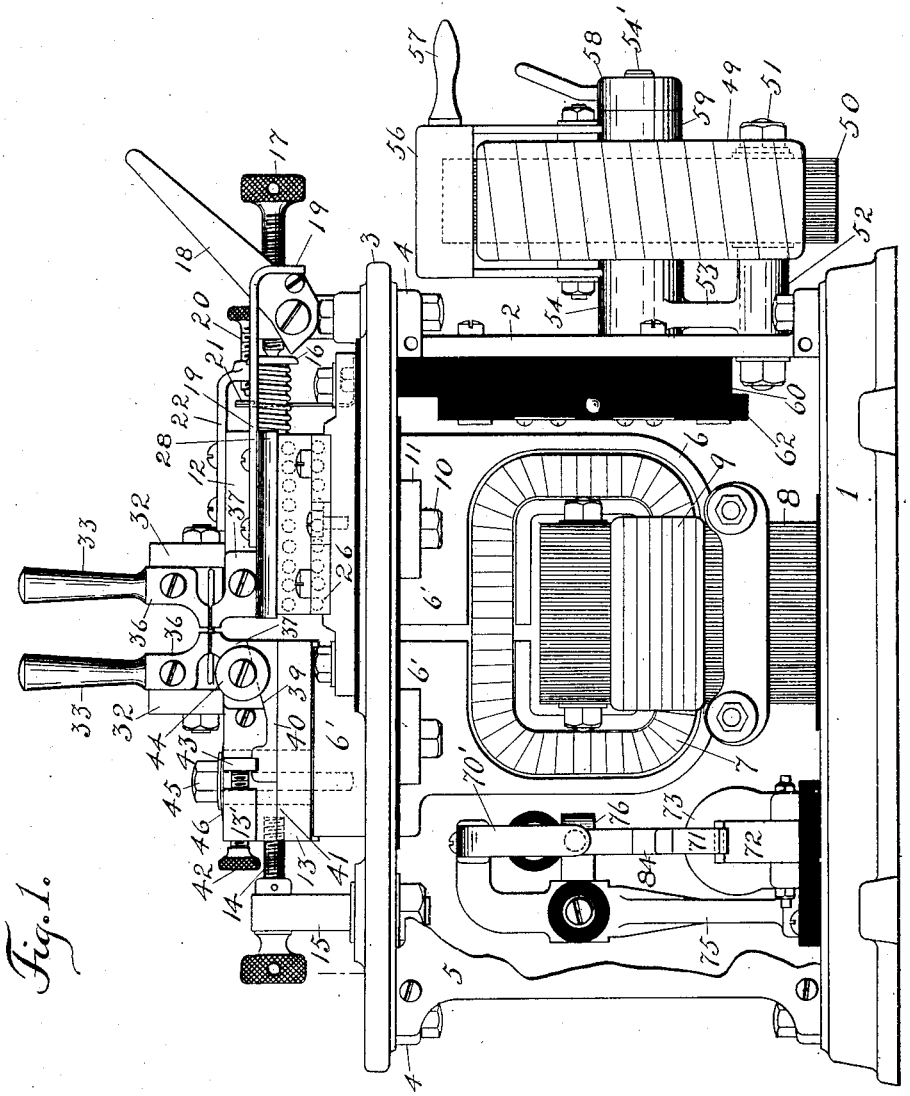

No. 785,379. PATENTED MAR. 21, 1905.
A. F. RIETZEL.
ELECTRIC WELDING MACHINE.
APPLICATION FILED NOV. 16, 1903.

6 SHEETS—SHEET 1.

WITNESSES:
C. F. Tischner Jr.
E. L. Lawler.

INVENTOR
Adolph F. Rietzel.
BY
Townsend & Decker
ATTORNEYS

No. 785,379. PATENTED MAR. 21, 1905.
A. F. RIETZEL.
ELECTRIC WELDING MACHINE.
APPLICATION FILED NOV. 16, 1903.

6 SHEETS—SHEET 2.

WITNESSES:

INVENTOR
Adolph F. Rietzel
BY
Townsend + Decker
ATTORNEYS

No. 785,379. PATENTED MAR. 21, 1905.
A. F. RIETZEL.
ELECTRIC WELDING MACHINE.
APPLICATION FILED NOV. 16, 1903.

6 SHEETS—SHEET 3.

WITNESSES:

INVENTOR
Adolph F. Rietzel.
BY
Townsend & Decker
ATTORNEYS

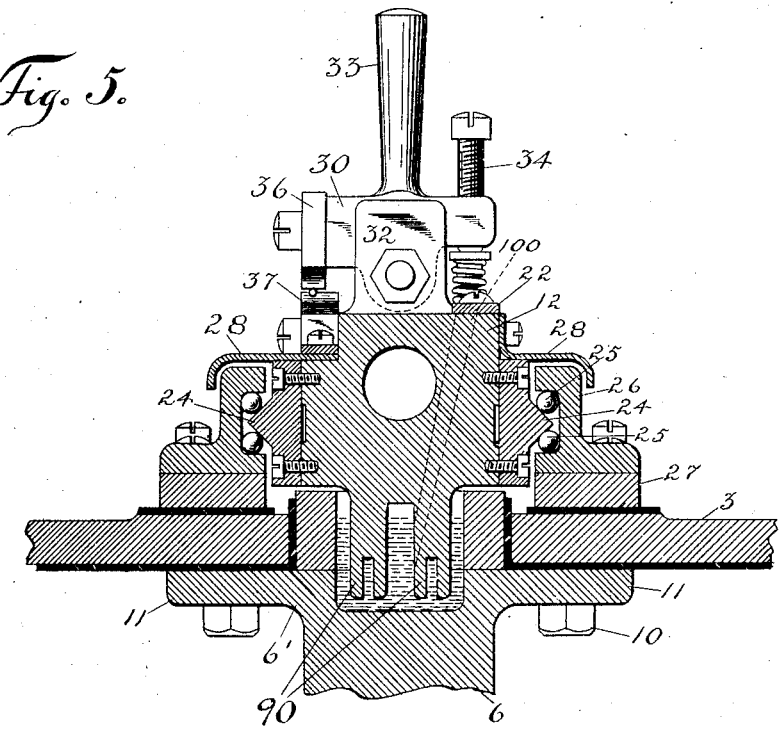
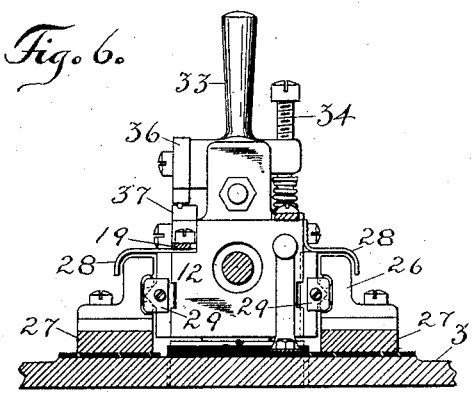
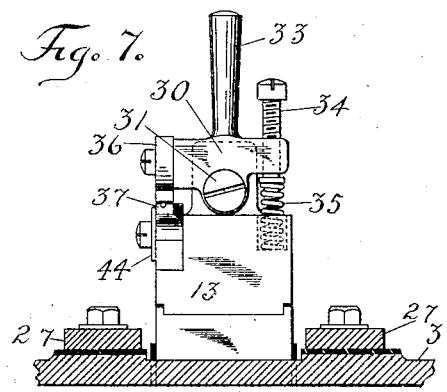

No. 785,379. PATENTED MAR. 21, 1905.
A. F. RIETZEL.
ELECTRIC WELDING MACHINE.
APPLICATION FILED NOV. 16, 1903.
6 SHEETS—SHEET 6.
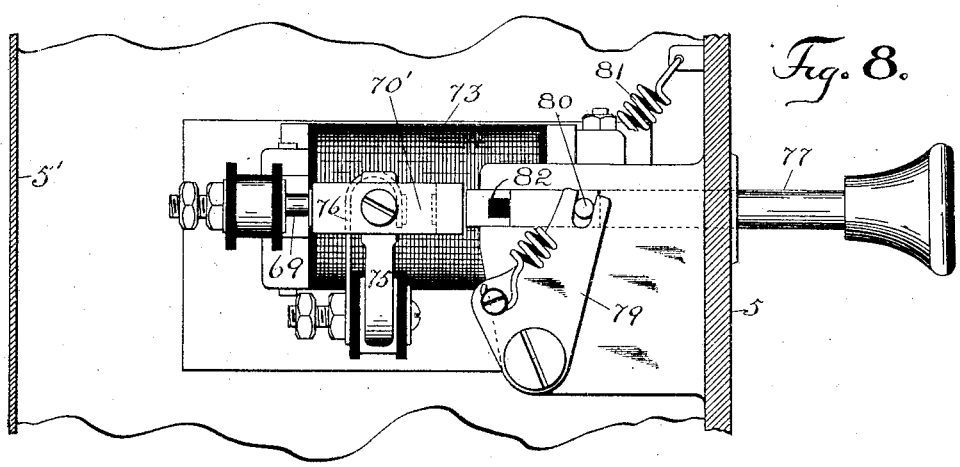
Fig. 8.
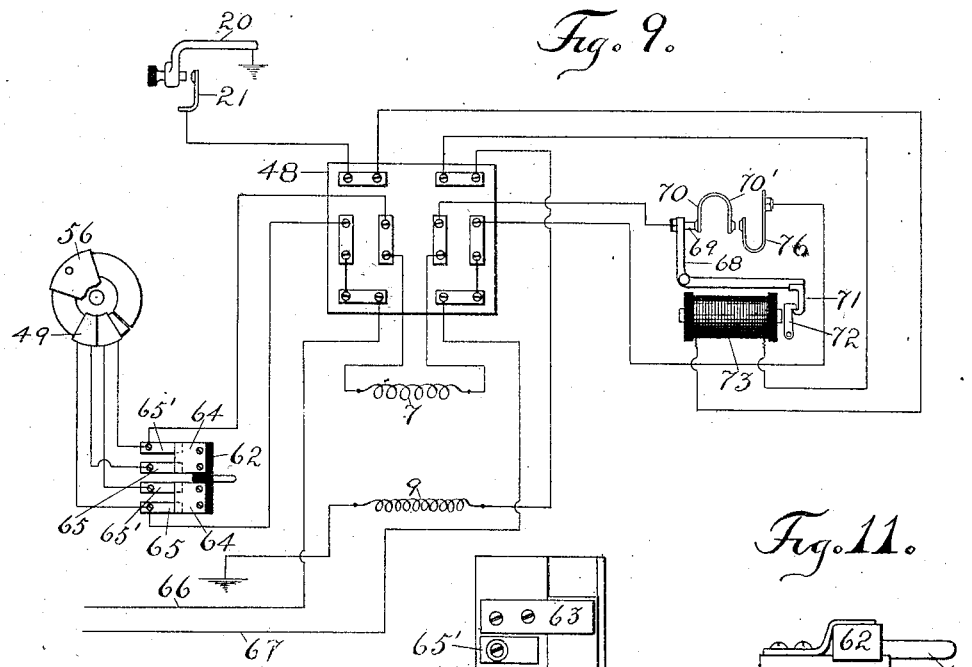
Fig. 9.
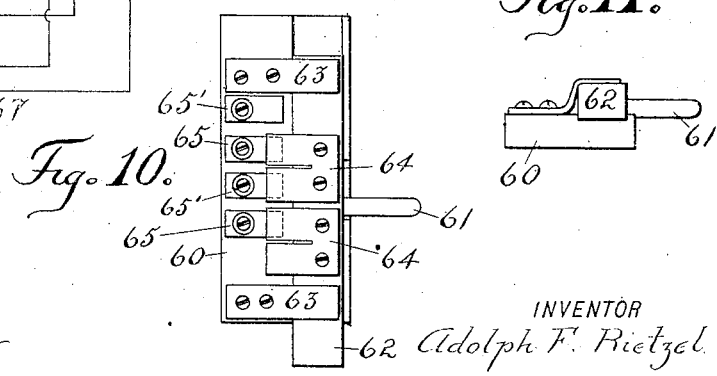
Fig. 11.
Fig. 10.
WITNESSES:
A. F. Kirchner Jr.
E. L. Lawler.
INVENTOR
Adolph F. Rietzel
BY
Townsend & Decker
ATTORNEYS No. 785,379. Patented March 21, 1905.

UNITED STATES PATENT OFFICE.

ADOLPH F. RIETZEL, OF LYNN, MASSACHUSETTS, ASSIGNOR TO THOMSON ELECTRIC WELDING COMPANY, OF LYNN, MASSACHUSETTS, A CORPORATION OF MAINE.

ELECTRIC WELDING-MACHINE.

SPECIFICATION forming part of Letters Patent No. 785,379, dated March 21, 1905.

Application filed November 16, 1903. Serial No. 181,419.

*To all whom it may concern:*

Be it known that I, ADOLPH F. RIETZEL, a citizen of the United States, and a resident of Lynn, in the county of Essex and State of Massachusetts, have invented certain new and useful Improvements in Electric Welding-Machines, of which the following is a specification.

My invention relates to that class of metal-working apparatus in which the work is heated by the passage of an electric current, and is especially useful in the metal-working operation known as "electric welding," in which the parts to be welded are secured in suitable work holders or clamps adapted to be moved toward one another for the purpose of applying the welding pressure.

I hereinafter describe my invention as carried out in a machine in which the heating-current is passed from one to the other of two work-holding slides or carriers which move toward one another to effect the weld or otherwise operate by pressure upon the heated section of work; but in some of its features my invention is obviously applicable to machines or devices organized to furnish the heating-current to the work in other ways.

While the invention is useful for welding-machines, it is also applicable to machines designed for upsetting or other metal-working acts.

The main object of my invention is to provide an apparatus especially suitable for performing the welding or other operation quickly, reliably, and uniformly with as little manipulation as possible.

A further object is to permit the operations to be safely and easily conducted by persons having little or no knowledge of the mechanical or electrical conditions necessary to produce good work.

An apparatus constructed in accordance with my invention is especially useful for welding very small sizes of iron, brass, German-silver, copper, or other wire, in which operation in order to produce successful welds it is necessary that the action of the machine be largely automatic and that the mechanism be delicately constructed and the moving parts so designed as to have the least amount of friction, inasmuch as the pressure which it is desirable to use upon the work when sufficiently heated is very slight.

One of the principal features of my invention, however, relates to the manner of combining the automatic cut-off devices which automatically stop the flow of the current through the work when the weld is completed and the device which starts the flow of current through the work at the beginning of the operation, which latter device is ordinarily in the form of an electric switch which completes the flow of current through the primary of a transformer when the transformer is employed to furnish from its secondary the heating current. This part of my invention consists, broadly, in so combining the cut-off devices and the starting-switch or other starting device that the cut-off can only be reset by restoring the starting device to position in which no current can flow through the work.

In the manipulation of electric welding or similar apparatus provided with an automatic cut-off switch and a starting-switch it is necessary when the work is small and delicate that the operator of the machine should, after placing the work in the machine, first reset the automatic cut-off and then close the hand-switch or starting-switch to cause the current to flow through the work, after which the automatic cut-off device is opened automatically to throw off the current when the weld has been effected. If the operator reverses the operation and first closes the starting-switch or neglects to open the starting-switch after the weld is completed and then resets the automatic switch or cut-off by hand, he is liable to spoil the work, because the moment he resets the automatic cut-off the current begins to flow and will continue to flow so long as to spoil the work, because being obstructed by the hand of the operator the cut-off device cannot instantly act. My invention overcomes this difficulty by insuring the required train of actions and making it impossible for the operator to reset the cut-off device without restoring the starting device or switch to the normal position. Preferably I accomplish this result by using a single operating push-rod or lever, which has the double function of resetting the cut-off and acting on the starting-switch or similar appliance for starting the flow of current through the work, said actuating device being so combined with the parts that to reset the automatic cut-off it is necessary to restore the starting device to normal position or position in which no current will flow. The reverse or forward movements of the actuating rod, button, or similar appliance starts the flow of current and the cut-off device thereafter acts in its normal or intended manner.

Another part of my invention relates to the construction and manner of mounting the work-holding slide or block, which carries one of the work-holders and which for delicate work must be so constructed as to have the utmost freedom of movement, while at the same time being so guided as to move in a perfectly rectilinear path. The principal object of this part of my invention is to secure these mechanical characteristics without passing any of the heating-current through the guiding parts. This part of my invention consists in the combination, with the work-holder or slide having roller or ball guide-bearings of proper construction, of suitable fingers or projections extending from said slide into immersion in a body of mercury or other good conductor contained in a cavity formed in the block or body of metal supplied with heating-current. Preferably the liquid-holding cavity is formed in the terminal of a transformer-secondary.

Another object of my invention is to so construct the machine that it shall be perfectly self-contained, the current-controlling device or device which adjusts the strength of the heating-current, the automatic cut-off, and the starting device or circuit-closer all forming a part of the machine itself, so as to make the apparatus compact and easy to move from one place to another. Heretofore in this class of machines the current-regulator, automatic cut-off, and circuit-closer or starting-switch have been ordinarily made in distinct parts separate from the welder or metal-worker and mounted on a stand with the welder proper, making the apparatus cumbersome and not readily transportable from place to place in the factory where it is in use.

My invention relates, further, to the means for adjusting the jaws, which are mounted on the work-holder in order to get the desired alinement of the parts to be welded, to the construction of the work-holding clamps, and to other details of construction, all of which will be more particularly hereinafter described and then specified in the claims.

The invention consists, further, in certain details of construction and combinations of parts, as hereinafter described and claimed.

Figure 2:
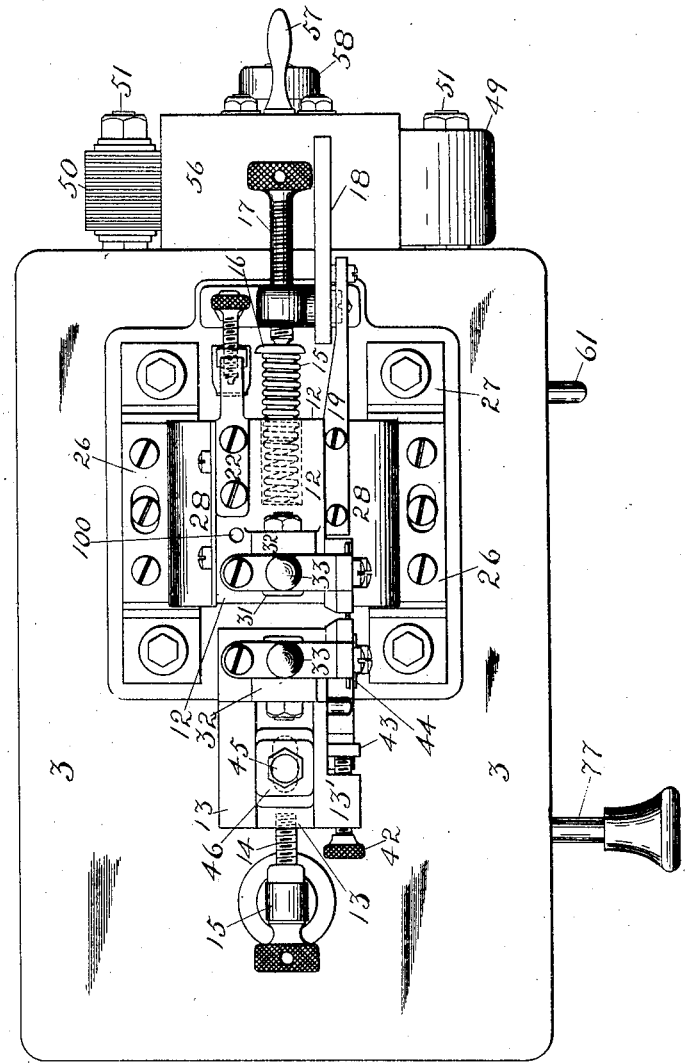
Figure 3:
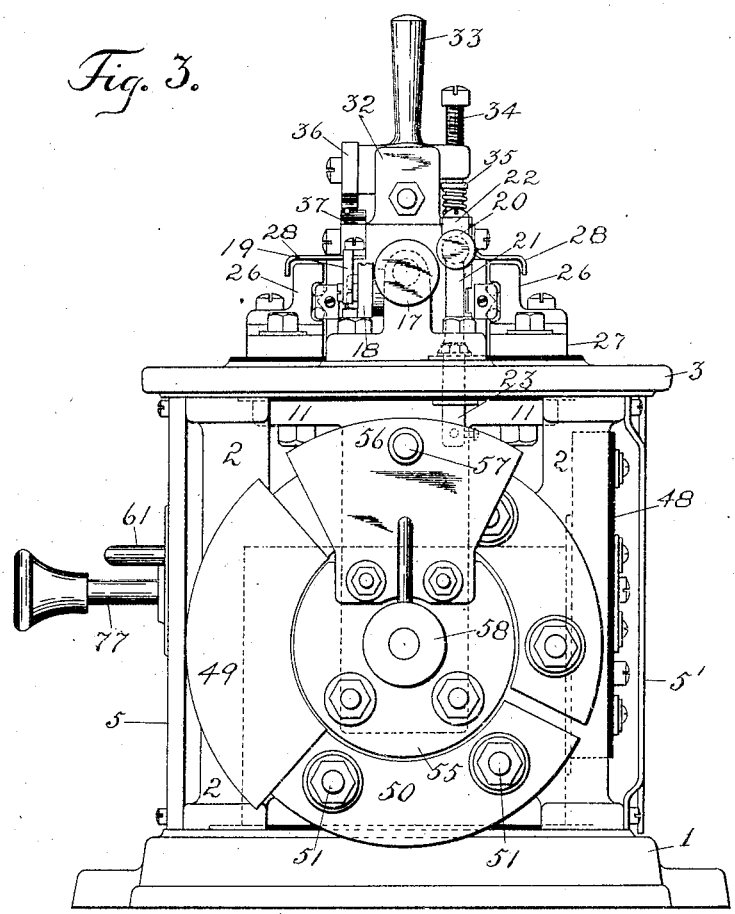
Figure 4:
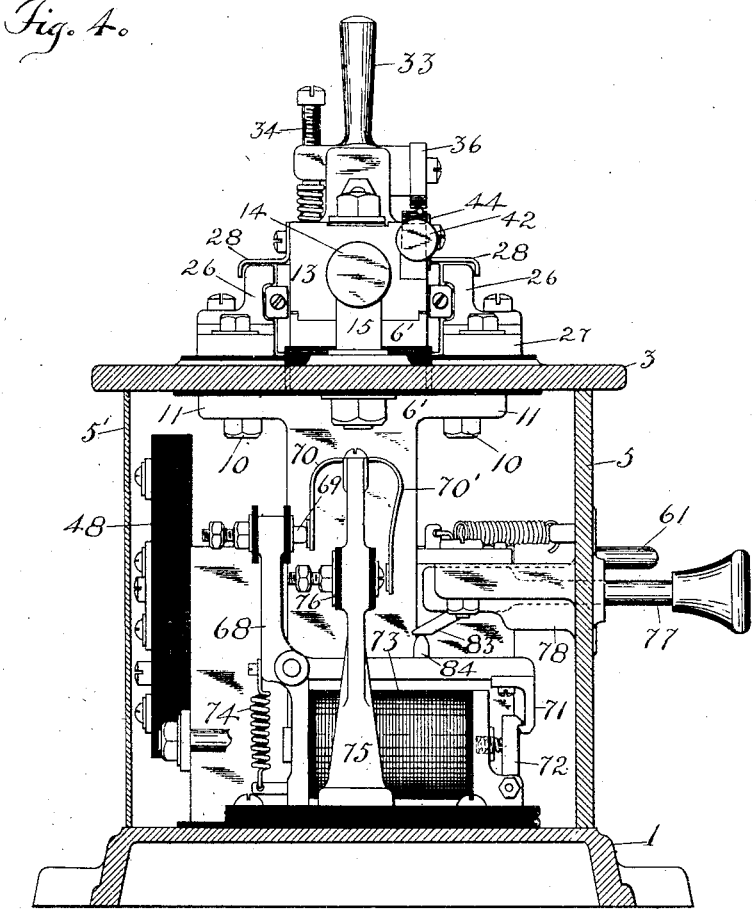

In the accompanying drawings, Figure 1 is a front elevation of the machine with the front plate of the casing being removed. Fig. 2 is a plan of the same. Fig. 3 is an end elevation looking at the right-hand end. Fig. 4 is an end elevation looking at the left-hand end, the end cover-plate being removed and the casing being shown in vertical section. Fig. 5 is a vertical cross-section through the movable work-holding slide. Fig. 6 is an end view of one of the work-holding slides and clamping device for the work. Fig. 7 is a similar view of the other work holding and clamping device. Fig. 8 is a detailed plan view of the starting device or switch, together with the parts of the automatic cut-off. Fig. 9 is a diagram of circuits of the apparatus. Fig. 10 shows in detail the switch for changing the connections of the reactive coil for the current controlling or adjusting apparatus. Fig. 11 is an end view of said switch.

1 is the base, carrying the end frames or posts 2, bolted or otherwise fastened to the base and surmounted by the table or plate 3, above which are located the work-holding slides and other parts, as more particularly hereinafter described. The plate or table 3 is properly bolted to ears or projections 4 on the end posts or frames 2.

The front plate or cover 5 closes in the apparatus beneath the table at the front portion of the machine and a similar plate 5' is preferably used to close in the back. These plates are fastened by screws or otherwise to the posts or standards 2, and the front plate 5 is preferably employed as a support for the operating-rod of the starting device or switch which is actuated for the purpose of starting the flow of current through the work, as will be more particularly hereinafter described.

6 is the secondary of a transformer of a type commonly used in electric metal-working apparatus.

6' 6' are the secondary-terminals, to which are connected the work-holders or work-holding slides. Said transformer-secondary is a casting having a groove in its side in which is located the usual primary 7. The laminated-iron core or magnetic circuit of the transformer (indicated at 8) is of the usual shape and is preferably insulated from the base 1. Upon one leg of said laminated-iron core may be wound the supplemental coil 9, which supplies current for energizing the magnet of the automatic cut-off. This coil takes the place of the coil described in United States patent to Lemp and Anderson, No. 519,336, as being located in one face of the transformer-secondary.

The transformer as a whole may be supported on the table 3 by means of bolts, the heads of which are indicated at 10, and which bolts pass through ears 11, extending transversely from the secondary-terminals. Upon the terminals 6' are mounted the work-holding slides or carriers 12 13. The slides or carriers are provided with the usual work-holding jaws or clamps, and the left-hand one of them, 13, as seen from the front of the machine, Fig. 1, is capable of a limited movement in ways planed or formed in the top of the secondary-terminal 6' to permit it to be adjusted to a limited extent by means of a suitable adjustment-screw 14, mounted on a post 15, secured to the top of the table 3. The other work-holding slide 12 is capable of horizontal movement to and from the slide 13 and is the slide by means of which pressure is applied to the work to effect the welding or other operation. The slide or carrier 12 is actuated by spring 15, which is seated in a longitudinal socket entering the rear of the slide, and which spring at its outer end carries a pin the shank or stem of which is contained within the coils, while the head 16 of said pin is engaged by an adjusting-screw 17. The latter screw is mounted on a post fixed on the table 3, and by means of it the force of the pressure-spring 15 upon the slide or work-holder 12, and hence the amount of pressure applied to the heated work, may be readily adjusted. The slides or work-holders, with their attached clamping-jaws, are moved apart the requisite distance to permit the work to be inserted by means of a cam-lever 18, mounted on the post which carries the adjusting-screw 17. Said cam-lever engages by a suitable pin with the rear end of an arm or bar 19 with a turned-down end, suitably fastened to the work-holding slide 12 on a ledge or offset at the side thereof, as seen in Figs. 2 and 6.

20 is the adjustable contact of a circuit closer or controller which when the slide is moved sufficiently far to complete the work will engage a contact-spring 21, and thereby close the circuit of an electromagnet, which will release the cut-off switch in the manner well understood in the art. The contact 20 may be mounted in the downwardly-projecting end of a bar or arm 22 and secured to the slide 12, as shown, while the contact-spring 21 may be secured on the top of the table, but suitably insulated therefrom.

23 (see Fig. 3) is a suitable post or bolt which serves to fasten said spring in place, said post being provided with a proper clamping device for attachment of an electric conductor; but the contact-screw and arm 22 are not insulated and are hence in connection through the slide, the adjusting-spring, and other parts with the frame of the machine.

The slide 12 is guided on suitable roller or ball bearings, which may be formed as follows and which serve to give freedom of movement, together with lateral rigidity, thereby causing the same to move in a perfect rectilinear path. These ball-bearing guides consist of the angular bearing-bars 24, fastened to the slide or block 12 at the opposite vertical faces thereof, as shown clearly in Fig. 5. These bearing-bars 24 have upper and lower ball-bearing faces, which extend laterally at a suitable angle to form cone-bearings for two longitudinal rows of balls 25, held between the bars 24 and the ballways or races formed on the inside of a longitudinal bar 26, fastened upon the top of the plate 27, secured to the upper faces of the table 3. Hoods 28, also fastened to the side of the slide 12, extend across the space between the two rails or bars 24 and 26 to exclude dirt. At the end of the ball races or ways are the retaining-plates 29, (shown more clearly in Fig. 6,) which serve to prevent the balls from escaping from the spaces between the two bearing plates or rails 24 26. As will be seen, these ball-bearing guides hold the slide rigidly against both lateral and vertical movement, although permitting the utmost freedom of longitudinal movement.

The bars 26 may be secured to the plates 27 in such way as to permit a slight lateral adjustment to take up wear.

Both rails 24 and 26, as will be seen, are readily detachable to permit them to be replaced in case of wear or damage.

The clamps for the work-holders are mounted upon the blocks or slides 12 and 13 in any suitable way and constructed in any desired manner. Preferably the movable clamping jaw or member of each clamping device consists of a clamp-lever 30, pivoted on a pin 31, which is secured in a post or vertical projection 32, extending upward from the slide or block 12 or 13. Each of said levers has a suitable operating-handle 33, and the rear end of the lever carries a pressure-adjusting screw 34, by means of which the clamping-pressure of a spring 35, seated in the socket in the rear side of the work-holding or work-carrying block or slide, may be adjusted in obvious manner.

At the front end of each clamping-lever is the clamp-jaw proper, 36, detachably secured to the vertical face of the front end of the lever.

As will be seen, each clamp-lever is mounted to swing in a vertical plane transverse to the line of pressure applied to the work, and each is readily manipulated by the operator by simply pressing the operating-handle 33 backward, or away from him when standing at the face or front of the machine. Each clamping-jaw 36 coöperates with the relatively fixed member or jaw 37, fastened beneath it to the corresponding slide or block 12 or 13, and each of said jaws 36 has, as will be seen, longitudinally-extending noses or projections, whose under sides are provided with working clamp-faces to engage the work. The lower members 37 have corresponding longitudinally-extending working faces, whereby, as will be obvious, the work may be readily viewed when secured in the machine. The spring 35 and screws 34 enable the operator to obtain a regulated pressure upon the clamping-jaws, which is adjustable according to the character of the work to be done, while at the same time the clamps are readily manipulated and the work is conveniently and readily inserted into place and can readily be seen. The lower clamping jaws or members 37 are suitably fastened to the side of the work-holding slides. To provide a vertical adjustment of the lower member of the work-holding clamp, it may be constructed and adjusted as shown in the case of the left-hand block or slide 13. In this instance the jaw 37 is formed at its under side with an inclined foot 39, which rests upon the correspondingly-inclined face of a longitudinally-adjustable plate 40, which works on a shoulder or guide formed at 41 on the side of the slide 13, and is adjustable by means of a screw 42, which is mounted, as shown in Fig. 2 more clearly, on a lateral offset or projection 13', extending from the block or head 13. The forward end of the adjustment-screw 42 has a collar or flange 43, which it takes into a notch in the rear end of the adjustable block or slide. The plate 40 is held from lateral displacement by the clamp plate or washer 44, secured beneath the head of the screw which fastens the lower jaw 37 in place. As will be understood, the screw would pass through an opening slightly enlarged vertically in said jaws 37 to permit vertical adjustment thereof under the action of the inclined adjustment plate or block 40. After vertical adjustment of the jaw 37 by turning the screw 42 the clamp plate or washer 44 may be set by the screw passing through the jaw 37, so as to firmly clamp or hold the parts in their adjusted position.

To hold the work-carrying slide 13 down to its bearings upon the face of the terminal 6', a headed bolt or pin 45 is set into the terminal 6' and extends up through a slot extending longitudinally in the slide 13. Plate-springs 46, interposed between the head of the pin and the upper face of the slide, hold the slide down. These plate-springs 46 work in a suitable guiding depression formed in the upper face of the slide.

The heating-current for the slide or terminal 12 is conveyed thereto independently of the ball-bearings by means of one or more fingers or projections 90 extending from said slide into the body of mercury or other good conductor contained in the cup or cavity in the transformer-terminal, as shown clearly in Fig. 5. The mercury may be introduced into said cup after the machine is assembled through the passage 100, Figs. 2 and 5.

On the rear edge of the transformer is fastened the terminal-board 48, which consists, as usual, of a block of insulating material and is provided with the connection-plates and fastening-screws, as more clearly shown in the diagram Fig. 9.

At one end of the machine and supported by a post or upright 2 is the current-regulating device, which is set according to the size of the work to be performed in order to adjust the amount of current. The current-regulating device may be of the general type shown and described in the patent to H. Lemp, No. 519,335, and is preferably interposed in the primary circuit of the transformer, as better shown in the diagram, Fig. 9. The sectional reactive coil of said device (indicated at 49) is wound upon the usual laminated core 50, and said core is bolted by the bolts 51 to bosses 52, formed on a plate 53, which in the center line with the core is formed with a boss 54, from which extends a bearing-pin 54', on which turns the laminated cylinder 55, filling the circular space within the core 50 and having mounted upon it the closed circuit band or conductor 56 of the Patent No. 519,335. From the latter extends the operating-handle 57, whereby the said conductor 56 may be adjusted to vary the reaction of the coils 49, as well understood in the art.

A suitable clamping-nut 58 is provided to set the conductor after adjustment. The bolts 51, which fasten the core 50 to the bosses 52, extend through said bosses and through the upright or post 2, thereby serving additionally as means for fastening the plate or frame 53, with the current-regulating device described, to said post.

Interposed between jam-nut 58 and the laminated cylinder-carrying conductor 56 is a suitable washer 59.

On the inner face of the post or upright 2 is secured a switch which changes the connections of the sectional coil 49 in the manner described in the Patent No. 519,335. The said switch is mounted upon a suitable plate 60, of insulating material, and a guide-groove cut in the face thereof, as shown in Fig. 11, guides the movable member 62, provided with the operating handle or pin 61, which projects through the front plate 5 of the casing convenient to the hand of the operator. Said member 62 consists of a plate or block which is held in its seat by means of springs 63, as shown in Fig. 10. Said movable member or block 62 carries the two contacts 64, which coöperate with the terminal-springs 65 and 65', which provide for a sectional coil 49, made in two sections. The two plates 65 are connected, respectively, as shown in the diagram, to the incoming and outgoing terminals of one of said sections and the plates or springs 65' similarly to the terminals of the other section, while the lower terminal or spring 65 connects with the main wire or conductor 66 through a fuse on the connecting-board 48, and the upper contact-spring 65' is connected over the connecting-board with one terminal of the transformer primary 7, from which the circuit continues through the contacts of the automatic cut-out to the opposite feed-wire 67, connecting with the source of alternating current.

As will be obvious, when the adjustable switch is set to the position shown in the diagram, Fig. 9, alternating current will flow through the two sections of coil 49 in multiple; but when by means of the handle 61 the switch is thrown down to p sition indicated in Fig. 10 then the current will flow through said sections of reactive coil in series and as more particularly described in the Patent No. 519,335 already referred to.

By means of the handles 61 and 57, conveniently accessible to the operator, it is obvious that he may readily vary the reaction to the flow of the alternating current in the primary 7, and hence adjust the strength of the current that will flow in any desired amount.

In place of the current-regulating device described as mounted upon the framework of the machine and forming practically an integral part of the apparatus self-contained as to its metal-working or work-holding parts and current-regulating device I may employ obviously other current-regulating appliances.

The automatic cut-off apparatus is of the general character heretofore employed in the art and comprises means for automatically cutting off the flow of current when the work-holding clamp or other device applying the pressure to the heated section of work has been permitted to move to a predetermined extent by the softening of the heated section of metal. An example of such an apparatus is described in the United States Patent to Elihu Thomson, No. 385,022, dated June 26, 1888. The circuit-opening lever 68 of said cut-off may be of the elbow form, as shown more particularly in Fig. 4. Its upright member carries the insulated contacts 69, which when the device is set engages the spring 70 and in such position closes an operating-circuit of the apparatus—as, for instance, the circuit of the primary 7 of the transformer.

The horizontal arm of the lever 68 carries a catch 71, which coöperates with a latch on the armature-lever 72 for the cut-off magnet 73 in the usual way. A spring 74 throws the lever 68 when the magnet acts so as to unlatch the lever, and the circuit is then opened between the coöperating contacts 69 and 70. The spring 70 is secured to the post 75, properly insulated and carrying the insulated contact-spring 76, with which a continuation 70' of the spring 70 is adapted to engage for the purpose of starting the flow of current through the work. Spring 70' and the coöperating spring 76 form substantially the members of a starting-switch or circuit-closer for the apparatus and complete the circuit of the primary for the transformer in the manner clearly shown in the diagram, Fig. 9.

The magnet 73 has one of its terminals connected to the contact-spring 21, with which the contact 20 coöperates to form the controlling device of the automatic cut-off, as well understood in the art. The other terminal of the magnet 73 connects, through the connecting-board 48, with a terminal to the release-coil 9, whose opposite terminal is connected to the frame of the machine typified as ground in the same manner as the contact 20. Hence when the work-carrying slide has been moved to the adjusted extent the magnet 73 will be energized, and if at such time the circuit of the primary be closed through springs 70 70' it is obvious that the cut-off will act and rupture the circuit by its contact 69, thus cutting off the flow of the heating-current.

The spring 70', with the coöperating spring 75, constitutes the starting device of the apparatus, which in the present instance is an electric starting device operating by closure of the circuit of the primary of the transformer. It will be understood, however, that said starting device might be of any other desired character and of such nature as to coöperate properly with the automatic cut-off and start the flow of heating-current through the work.

To actuate the starting device or switch, I may provide any desired means; but I prefer to use an actuating slide-rod 77, which projects through the front plate 5 of the apparatus and at its inner end is guided in a suitable guide-casting 78, cast or attached to the plate 5. On the top of said guide is mounted a swinging plate 79, one arm of which engages a pin 80 on the slide-rod, while another arm connects with a spring 81, which serves to retract the rod 77 after operation thereof for the purpose of starting the flow of the current. The rod 77 carries at its inner end the pin 82, preferably of insulation, which when the rod is forced inward engages the spring 70' to close the circuit of the primary of the transformer. Projecting also from said rod is an arm 83, adapted to engage, as shown more clearly in Fig. 4, with the horizontal arm of the cut-out lever or projection 84 thereof and in such manner as to depress the horizontal arm and cause it to be latched or caught by the armature 72 of the cut-off magnet.

As will be seen, when the parts are in the position shown in the drawings, which is their normal position, the contacts 69 and 70 of the automatic cut-off will be engaged; but the contacts 70' and 76 of the starting-switch will be opened and no current will flow, therefore, in the primary of the transformer, and hence no current can flow through the work. After the work-holding slides are moved apart the proper distance by means of the cam-lever 18 and the wire or other work has been clamped in the clamping-jaws the cam-lever is moved back and pressure put on the work by the spring 15, which is adjusted to the proper tension by the screw 17.

The current-controller having been set for the desired amount of current, the manual starting device, consisting of the rod or slide 77 or other device, is pushed inward by its knob and the spring 70 caused to engage the contact 76, whereupon current flows through the primary and the pieces becoming immediately heated are forced together by the spring 15 operating on the work-holding slide. This brings the controlling device, consisting of contact 20, into action, so as to close the circuit of magnet 73, which thereupon releases the cut-off lever. The latter being at such time freed from the manual device 77 immediately opens the circuit of the primary, and the flow of current through the welded pieces stops. When the operator releases the manual device 77 or pulls it back, (assuming that it has no retractile spring 81, which would be in some cases permissible,) the cut-off device is automatically reset in obvious manner; but this cannot be effected without an opening or resetting of the contacts of the starting-switch or circuit-closer 70' 76. It is hence impossible for the operator to leave the starting device "on" and after putting the work in the clamps to close the automatic cut-off.

What I claim as my invention is—

1. In an electric metal-working apparatus, the combination of a starting device for causing current to flow through the section of work to be heated, an automatic cut-off for stopping the flow of current through the work, means connected with the work-holder for bringing the cut-off into action when, by the softening of the work, said work-holder has been permitted to move to a predetermined extent, and means for resetting the cut-off device by readjustment of the starting device to position for placing the apparatus in condition in which no current will be supplied to the work.

2. In an electric metal-working apparatus, the combination of an automatic cut-off switch, a controlling-magnet therefor, a circuit-closer governing the circuit of said magnet and carried by the work-holder of the apparatus, a starting-switch and means for resetting the automatic cut-off by the starting-switch, when the latter returns to the position in which no current will be supplied to the work.

3. In an electric metal-working machine, an automatic cut-off switch and magnet therefor placed in the base of the machine and a resetting-rod extending through the casing of the machine and means connected with said rod for starting the flow of current through the work when the rod is actuated in one direction and for resetting the cut-off device when the rod is moved in the opposite direction.

4. In an electric metal-working apparatus, the combination substantially as described with the cut-off switch and magnet for releasing the same, a circuit-closer for starting the flow of current through the work, an actuating-rod for operating on said circuit-closer and means connected with said rod for resetting the cut-off switch when the rod is retracted.

5. In an electric metal-working apparatus, the combination substantially as described of a starting-switch or circuit-closer, a spring normally tending to hold the same open, and an automatic cut-off device actuated by said spring for resetting the cut-off.

6. In an electric metal-working apparatus, the combination substantially as described of an inclosed cut-off switch, a starting-switch or circuit-closer, an operating-rod extending through the wall of the inclosure and adapted to engage and close the starting-switch, a spring for actuating said rod and means connected with the rod for engaging and resetting the cut-off switch-lever.

7. In an electric metal-working apparatus, the combination with a work-holding slide mounted on ball or roller bearings adapted to hold the same against both lateral and vertical movement, of an arm, finger or projection extending from said slide into a body of mercury or other good conductor contained in a cup formed in the terminal of a transformer-secondary.

8. In an electric metal-working apparatus, the combination of the work-holding slide or block, of the angular ball-bearing, guide-plates secured to the opposite sides thereof, one or more fingers or projections extending from said slide, and a cup supplied with heating-current and containing mercury or other good conducting liquid in which said fingers or projections are immersed.

9. The combination with a work-holding slide or carrier, of a pressure-spring mounted in a socket in the rear thereof, an adjustable pressure-screw bearing against a headed pin inserted in the end of said spring, a cam-lever for retracting the slide against the pressure of said spring, and an arm or bar fastened to the slide and projecting rearwardly for engagement by the cam-lever.

10. In an electric metal-working apparatus, the combination with a spring-actuated work-holding slide or carrier, of an actuating-cam and a rearwardly-projecting arm or bar having a turned-down end and mounted upon a ledge or offset on the side of the slide.

11. In an electric metal-working apparatus, the combination with a spring-actuated slide and an adjustable pressure-screw, of a post supporting the same on the table of the apparatus, a vertically-swinging cam-lever mounted on the side of said post and a bar or arm projecting rearwardly from the slide for engagement by said cam-lever.

12. In an electric metal-working apparatus, a work-holding slide provided with ball-bearing guideways at its opposite vertical faces, each comprising two longitudinally-extending sets of balls working between ball ways or races adapted to hold said slide against lateral and vertical movement.

13. In an electric metal-working apparatus, the combination with the work-holding slide, of a ball-bearing guide-plate secured to the side thereof and having a lateral projection provided with upper and lower ball-bearing faces.

14. The combination with the work-holding slide, of two rows of balls at each side thereof engaged between the upper and lower ball-bearing faces carried by the slide, and suitable ball ways or races formed on the inside of a bar fastened to the bed of the machine.

15. In an electric metal-working apparatus, the combination with a work-holding slide, of ball-bearing guides adapted to hold the same against both lateral and vertical movement in combination with current-conveying fingers or projections carried by said slide and dipping into a body of conducting liquid.

16. In an electric metal-working apparatus, the combination with the work-holding slide or carrier and suitable guides therefor, of current-bearing fingers extending downward from the slide into a body of conducting liquid, as and for the purpose described.

17. In an electric metal-working apparatus, the combination with a transformer-secondary having a recessed terminal containing mercury or other liquid, of a longitudinally-guided work-holding slide, suitable guides therefor, and fingers or projections extending downward from the slide into said liquid.

18. In an electric metal-working apparatus, a work-holding slide having a clamp-lever mounted on a post or upright so as to swing in a vertical plane transverse to the line of pressure applied to the work, a clamping pressure-spring bearing against said lever at its rear end and adjustable by means of a screw passing through the rear end of said lever and a clamp-jaw at the forward end of said lever, as and for the purpose described.

19. In an electric metal-working apparatus, a clamp-lever mounted upon a suitable pin so as to swing in a vertical plane transverse to the line of pressure applied to the work, and a clamping-jaw upon the forward end of said lever having a longitudinally-extending nose or projection as and for the purpose described.

20. In an electric metal-working apparatus, a clamp-lever mounted upon the work holding or carrying slide and having a vertical operating-handle, and rearwardly and forwardly projecting arms in combination with pressure-spring interposed between the work-holding slide and a pressure-adjusting screw carried by the hand of said lever, and a clamping-jaw carried at the forward end of the lever, as and for the purpose described.

21. In an electric metal-working apparatus, the combination with the lower clamping-jaw, of a longitudinally-adjustable block mounted on the side of the work-holder slide and provided with an inclined face engaged by a correspondingly-inclined foot of said jaw, as and for the purpose described.

22. In an electric metal-working apparatus, the combination with a vertically-adjustable clamp-jaw, of a longitudinally-adjustable cam-plate engaging said jaw, as and for the purpose described.

23. In an electric metal-working apparatus, the combination with a work-holding slide or block of a clamp-jaw secured to a lateral face of the block and adjustable vertically thereon, a plate or block working on a ledge or shoulder on the side of the slide and provided with an incline engaged by said jaw and means for adjusting said plate, as and for the purpose described.

24. In an electric metal-working apparatus, the combination of a base having suitable posts or uprights, a table surmounting the same and having the welding-transformer and work-carrying slides fastened to it, and a current-regulating device fastened to the post or upright of the machine and comprising reactive coils and closed-circuit conductor coöperating as a current-regulator and a circuit-changing switch mounted on the opposite face of said upright and adapted to change the connections of the reactive coil, as and for the purpose described.

25. In an electric metal-working apparatus, the combination of the plate or table 3, having the work-holding slides, a transformer mounted upon it, a post or upright 2, a laminated core 5, secured to a frame or plate fastened to said upright, a sectional reactive coil 49 and a circuit-changing switch governing connection of the coil-sections and mounted upon the opposite face of the upright or post, and an actuating handle or device accessible to the operator, as and for the purpose described.

26. In an electric metal-working apparatus, a transformer having work-holders mounted upon its secondary, a suitable base, uprights and table, in combination with a current-regulator, automatic cut-off and starting-switch all mounted on the framework of the apparatus and having their adjusting handles or knobs all accessible from the same side of the machine the whole forming a self-contained metal-working apparatus operable as and for the purpose described.

Signed at Lynn, in the county of Essex and State of Massachusetts, this 2 day of November, A. D. 1903.

ADOLPH F. RIETZEL.

Witnesses:
C. I. LINDSEY,
E. W. HAWES.